United States Patent [19]
Kish et al.

[11] Patent Number: 5,441,373
[45] Date of Patent: Aug. 15, 1995

[54] COATED FASTENER

[75] Inventors: Frederick A. Kish, Wheeling; Parimal M. Vadhar, Buffalo Grove, both of Ill.

[73] Assignee: Illinois Tool Works Inc., Glenview, Ill.

[21] Appl. No.: 116,758

[22] Filed: Sep. 7, 1993

[51] Int. Cl.⁶ ................. F16B 15/00; F16B 15/08
[52] U.S. Cl. .................. 411/442; 411/258; 411/446; 411/452; 411/903
[58] Field of Search .......... 411/258, 301–304, 411/442, 443, 446, 902, 903, 452, 82

[56] References Cited

U.S. PATENT DOCUMENTS

| | | | |
|---|---|---|---|
| 3,568,746 | 3/1971 | Faroni et al. | 411/304 X |
| 3,813,985 | 6/1974 | Perkins | 411/442 |
| 4,664,733 | 5/1987 | Masago | 411/443 X |
| 4,837,090 | 6/1989 | Hyner et al. | 411/903 X |
| 4,964,774 | 10/1990 | Lat et al. | 411/903 X |
| 5,149,237 | 9/1992 | Gabriel et al. | 411/442 X |

*Primary Examiner*—Neill R. Wilson
*Attorney, Agent, or Firm*—Schwartz & Weinrieb

[57] ABSTRACT

A coated fastener includes a coating comprised of one-hundred percent dry solids which is virtually free of solvent emissions when applied and during curing, covers substantially the entire exterior of the fastener, provides a protective coating to the fastener against corrosion, enables the fastener to be adhered to at least one other fastener, and provides increased holding power of the fastener after the fastener is driven into a desired surface.

22 Claims, 1 Drawing Sheet

COATED FASTENER

BACKGROUND OF THE INVENTION

1. Field of the Invention

This invention relates generally to coated fasteners, and more particularly to a fastener, such as a staple or a nail, having a coating composed of 100% dry solids which is virtually free of solvent emissions when applied and during curing, covers substantially the entire exterior of the fastener, protects the fastener against corrosion, is capable of adhering successive fasteners together into a strip or block, and provides improved retention of the fastener when driven into a desired surface.

2. Description of the Related Art

Fasteners are typically coated to protect the fastener from corrosion and to adhere a plurality of fasteners together into a strip or block for ease of handling with a fastener driving tool. An example of such a coated fastener is illustrated in U.S. Pat. No. 3,813,985 which discloses a coating composed of a nitrocellulose resin dissolved in an organic solvent. After the solvent is evaporated the coating adheres to the fastener and can be utilized to adhere successive fasteners into a strip.

Upon evaporation of the solvent in such coatings, however, a large amount of undesirable volatile compounds are emitted. To conform to existing government regulations, the emitted volatile compounds must be contained and properly disposed which adds significant costs to the process.

A nitrocellulose resin itself is also physically weak, especially in tension, and provides a relatively weak bond with the fastener, especially when the fastener is composed of steel. Thus, such a resin tends to flake off the fastener before and during application. Additionally, when a nitrocellulose coated fastener is subjected to a removal force, either the bond between the resin and the fastener fails or the resin itself fractures.

It therefore would be desirable to provide a fastener having a coating composed of 100% dry solids which is virtually free of solvent emissions when applied and during curing, is strong in tension, covers substantially the entire exterior surface of the fastener, provides increased bonding to the fastener, protects the fastener against corrosion, adheres successive fasteners together in a strip, and provides increased retention of the fastener when driven into a desired surface.

SUMMARY OF THE INVENTION

The invention provides a fastener having a coating thereon which is composed of 100% dry solids, is virtually free of solvent emissions during application and curing, is strong in tension, covers substantially the entire exterior of the fastener, provides increased bonding to the fastener, protects the fastener against corrosion, enables the fastener to be adhered to at least one other fastener, and provides increased holding power of the fastener after it is driven into a desired surface.

The coating is particularly useful when it is first applied to a plurality of metal wires which are then adhered together by the coating alone during curing of the coating to provide a band of adhered wires. The band is then formed to provide a strip of staples or nails for ease of shipping, packaging and loading into a driving tool. Upon separating a fastener from the strip and driving the fastener into a desired surface, such as wood, friction created during driving enables bonding of the coating to the wood to enhance the holding power of the fastener.

BRIEF DESCRIPTION OF THE DRAWINGS

Various objects, features, and attendant advantages of the present invention will be more fully appreciated from the following detailed description, when considered in connection with the accompanying drawings, in which like reference characters designate like or corresponding parts throughout the several views, and wherein.

DESCRIPTION OF THE PREFERRED EMBODIMENTS

Figure 3:
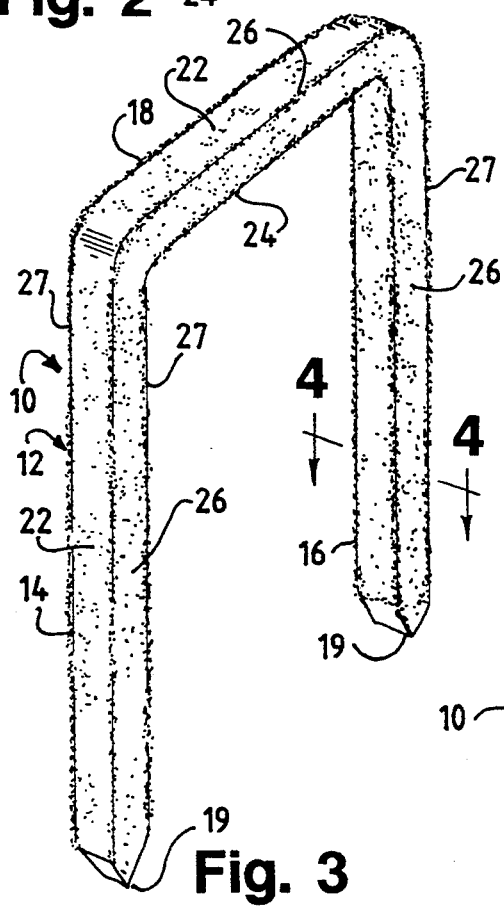
FIG. 3 is a perspective view of a single fastener including the coating of the invention.

Referring to FIG. 3, a fastener, such as a staple, is designated generally by the reference numeral 10 and includes a coating 12 of the invention thereon. Although the fastener 10 is illustrated throughout the drawings as a staple, it is to be understood that any fastener can be utilized so long as the coating 12 is provided as described herein.

The staple 10 preferably includes first and second legs 14 and 16 interconnected by a crown 18, and includes the coating 12 substantially about its entire exterior surface. Preferably, each leg 14 and 16 is formed with a chisel point 19 for driving of the staple into a desired surface, but can vary.

Figure 1:
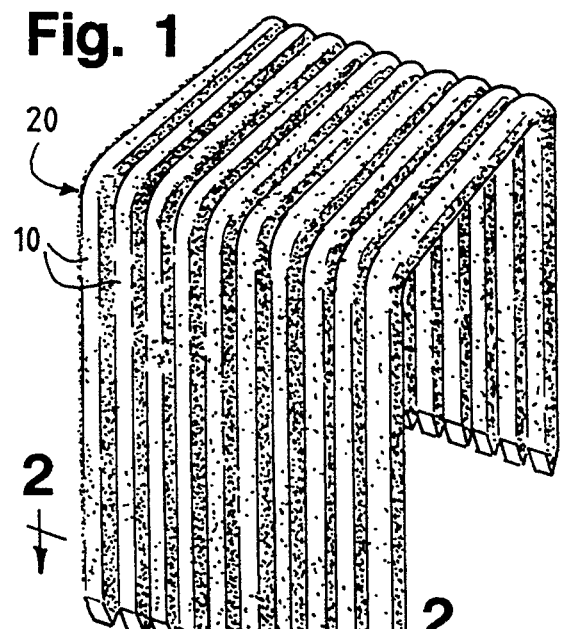
FIG. 1 is a perspective view of a strip of fasteners including the coating of the invention.

As FIG. 1 illustrates, the staples 10 are typically provided in a strip or block 20 where the staples 10 are adhered together by the coating 12 during curing thereof. The strips 20 typically include between fifty and one-hundred staples 10, but the number can vary.

Figure 2:
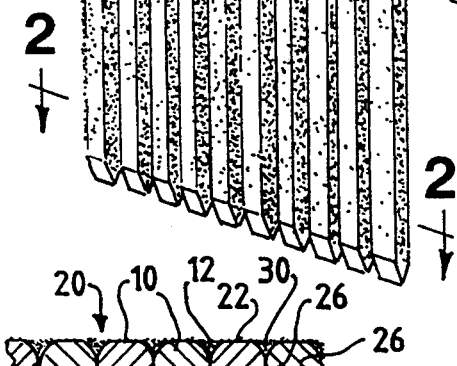
FIG. 2 is a cross-sectional view of a portion of the strip of fasteners of FIG. 1 taken along line 2—2 of FIG. 1 and in the direction indicated.
Figure 4:
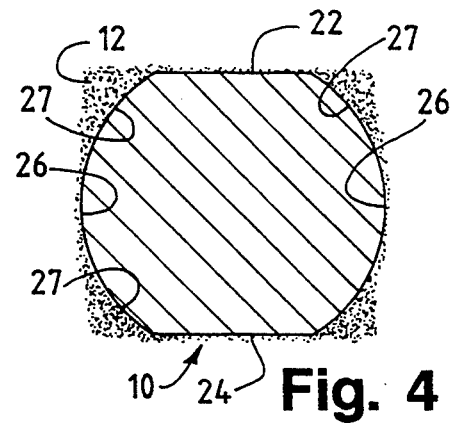
FIG. 4 is a cross-sectional view of the fastener of FIG. 3 taken along line 4—4 of FIG. 3 and in the direction indicated.

As FIGS. 2 and 4 illustrate, each staple 10 is preferably substantially oval in cross-sectional configuration including substantially planar side surfaces 22 and 24, opposite arcuate ends 26, and four arcuate corners 27. The particular size and shape of the staple 10, however, can vary.

The coating 12 is provided on substantially the entire external periphery of the staple 10, preferably by the method and apparatus shown in co-pending U.S. application Ser. No. 08/121,915, entitled "METHOD AND APPARATUS FOR COATING FASTENERS" and filed concurrently herewith, the disclosure of which is hereby incorporated by reference. That method provides for the application of the coating 12 in an electrostatic process, the wiping of excess coating 12 from desired portions of stock metal wires, curing the coating 12 by heating and subsequent cooling so as to adhere the coating 12 to the wires and adhere successive wires together into a band, and forming the band of wires into a strip 20 of staples 10. It is to be understood, however, that the particular method utilized to provide the coating 12 can vary.

As FIGS. 2-4 illustrate, the coating 12 is preferably slightly thinner on the side surfaces 22 and 24, and ends 26 than it is at the corners 27 of each fastener 10. The thicker coating on the corners 27 enhances adhesion with an adjacent staple and increases the retention of the staple 10 within a desired surface, such as wood, as explained in detail below.

The thinner coating 12 on the side surfaces 22 and 24, and the arcuate ends 26, enables the exterior dimensions of the staple 10 to be reduced so the staple 10 will fit within the magazine and bore of a driving tool without jamming. Accordingly, the thickness of the coating 12 on any surface of the staple 10 can vary depending on the particular application and driving tool utilized.

As FIG. 2 illustrates, due to the shape of the staples 10, a recess 30 is provided between successive staples 10 on both side surfaces 22 and 24 thereof which is substantially filled with coating 12. The coating 12 within the recess 30 provides for increased adhesion between staples 10 and, after a staple 10 is separated from a strip 20, provides the thicker coating on the corners 27. The width of the top of the coating within the recess 30 is typically about 30-40 mils, while the depth is about 15-25 mils, but can vary.

Figure 5:
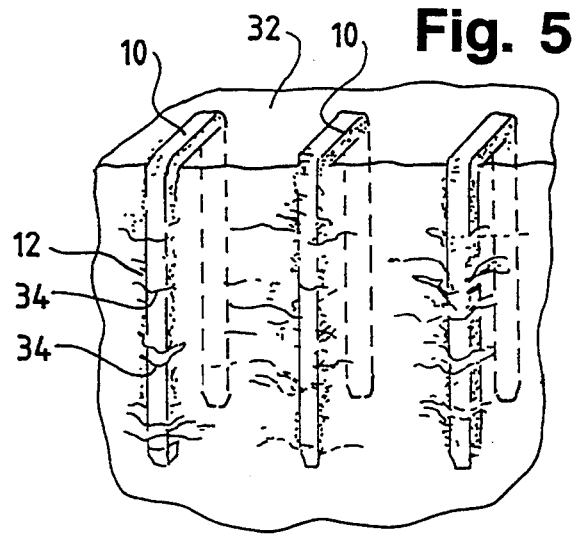
FIG. 5 is a perspective view of a plurality of fasteners including the coating of the invention illustrated driven into a desired surface.
Figure 6:
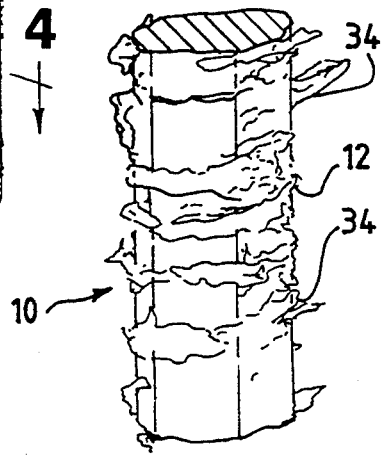
FIG. 6 is an enlarged partial side elevational view of a fastener including the coating of the invention illustrating the fastener after being removed from a desired surface.

As FIGS. 5 and 6 illustrate, the coating 12 effectively provides an adhesive as well as a mechanical bond with the material of a surface 32, such as wood, into which the staple 10 is driven. The term "adhesive bond" is used herein to include both a physical bond between the coating 12 and the material of the surface 32 as well as a chemical bond therebetween. The particular bond depends upon the type of coating 12 utilized and the particular material of the surface 32.

When the staple 10 is driven into the surface 32, friction between the coating 12 and the surface 32 is created which provides a driving temperature estimated to be between 140°-200° F. (60°-93° C.) depending on the material of the surface 32. This driving temperature is sufficient to enable the coating 12 to at least become soft or semi-viscous, which occurs at approximately 140°-150° F. (60°-70° C.). Thus, upon cooling, the coating 12 bonds to the surface 32 so as to provide an adhesive bond therewith, which can include a chemical reaction, and significantly enhances the holding power of the staple 10.

In contrast, a nitrocellulose coating does not appear to have a softening point. It appears to soften at about the same temperature at which it begins to degrade, 302°-320° F. (150°-160° C.).

Additionally, increased retention may be provided by the irregular or roughened surface of the coating 12 on the staple 10. The irregular surface appears to provide increased mechanical retention of the staple 10 within the surface 32.

Figure 7:
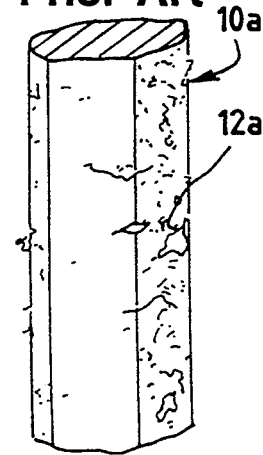
FIG. 7 is an enlarged partial side elevational view of a prior art fastener after being removed from a desired surface.

As FIG. 6 illustrates, when a staple 10 is removed from a wood surface 32 the adhesive and mechanical bonding of the coating 12 rips out substantial pieces of wood fibers 34. Conversely, as FIG. 7 illustrates, a prior art staple 10a with a nitrocellulose coating 12a retains a much smaller amount of fibers illustrating decreased bonding and holding power as compared with the coating 12 of the present invention. This decreased bonding and holding power is corroborated by pull-out testing as described hereinafter.

As discussed above, the nitrocellulose resin itself is physically weak and provides relatively poor adhesion with the fastener. Additionally, no apparent chemical adhesive bond is provided between the nitrocellulose coating and the surface into which the coated fastener is driven. Thus, when a nitrocellulose fastener is subjected to a substantial pullout force, one of three things or a combination thereof can occur. First, the bond between the nitrocellulose coating and the fastener can fail. Second, the nitrocellulose coating itself can crack and fail. Finally, the mechanical hold or grip between the nitrocellulose coating and the surface can fail.

The coating 12 of the present invention, however, is very strong in tension and provides a very strong bond with the staple 10 as well as with the surface 32. The bond between the coating 12 and the staple 10 can be either a physical or chemical bond. In fact, when subjected to extreme pull-out forces, neither the coating 12 or its bond with the staple 10 or surface 32 fails, but rather, portions of the surface 32 tend to fail. This is illustrated in FIG.. 6 where, after being pulled out of the surface 32, the staple 10 retains a substantial amount of wood fibers 34 thereon. The coating 12 and its bond with the staple 10 and surface 32 substantially remain intact.

The coating 12 can be a powder coating, a U.V. cured coating, or a water based coating. Preferably, a powder coating is utilized which can be polyester, polyethylene, nylon, or epoxy, or any other material so long as it functions as described herein.

The preferred powder coating 12 is composed of polyester and is black in color, but can vary. The polyester coating 12 includes, by weight, from about 80-90 percent polyester resin, 4-5 percent accelerator, 1-2 percent flow control agent, 3-4 percent dispersing agent, and 1 percent surface active or open agent. The accelerator is utilized to increase the reaction rate during curing and is preferably hydroxyalkyl amide. The flow control agent improves the flow and appearance of the coating and is preferably an acrylic based material. The dispersing agent is preferably stearic acid, which helps to prevent agglomeration of powder, while the surface active agent is preferably benzoin which allows the coating to degas during curing so as to reduce production of porous and brittle coatings. Emissions during application and curing of the polyester coating 12 are estimated to be 1%, with 98% of that amount being moisture.

The coating 12 is preferably non-conductive so that it can be applied electrostatically and is either black, blue, or green in color, but can vary. Other thermosetting coatings, such as epoxy, have been successfully utilized.

Furthermore, thermoplastic coatings can be utilized to form the coating 12, such as polyethylene or nylon, so long as the particle size of those materials is ground to be very fine. To obtain such fine particle sizes with thermoplastic materials, however, liquid nitrogen is typically utilized during grinding which adds significant costs to the material.

The following examples illustrate the coating 12 of the present invention.

EXAMPLE I

EXAMPLE I

| COMPONENTS | WEIGHT PERCENT |
| --- | --- |
| Polyester Resin | 89.0 |
| Hydroxyalkyl Amide | 4.8 |
| Acrylic Flow Agent | 1.6 |
| Benzoin | 0.8 |
| Stearic Acid | 3.8 |

The above coating composition provided excellent protection against corrosion, excellent coverage and adhesion between staples 10, and excellent retention within a surface.

EXAMPLE II

EXAMPLE II

| COMPONENTS | WEIGHT PERCENT |
| --- | --- |
| Epoxy Resin | 50.0–70.0 |
| Aromatic Amine | 10.0–30.0 |
| Carbon Black | 1.0–5.0 |
| Calcium Carbonate | 10.0–30.0 |
| Calcium Sulfate | 10.0–30.0 |
| Bisphenol A | 5.0–10.0 |

As noted above, the coating 12 substantially increases the holding power of the staple 10 when driven into a given surface due to the adhesive and mechanical bonding which occurs between the coating 12, the staple 10, and a given surface.

For example, tests have been conducted with staples 10, including the powder coating 12 thereon, inserted within samples of spruce-pine-fir (SPF) wood and removed. Holding power was determined immediately after insertion. The following table summarizes the results of those tests.

TABLE I

HOLDING POWER OF POLYESTER POWDER COATED STAPLE IN SPF WOOD

| SAMPLE NUMBER | FASTENER LENGTH (IN) | PENETRATION DEPTH (IN) | ULTIMATE PULL-OUT VALUE (LBS) | ADJUSTED PULL-OUT VALUE (LBS/IN) |
| --- | --- | --- | --- | --- |
| 1 | .983 | .722 | 133 | 184.21 |
| 2 | .983 | .715 | 116 | 162.23 |
| 3 | .983 | .722 | 125 | 173.13 |
| 4 | .983 | .708 | 104 | 146.89 |
| 5 | .983 | .682 | 110 | 161.29 |
| 6 | .983 | .700 | 120 | 171.42 |
| 7 | .983 | .720 | 104 | 144.44 |
| 8 | .983 | .732 | 87 | 118.85 |
| 9 | .983 | .681 | 68 | 99.85 |
| 10 | .983 | .680 | 70 | 102.94 |

The adjusted pull-out value is obtained by dividing the ultimate pull-out Value by the penetration depth so as to eliminate any variances from differences in the penetration depth. The mean adjusted pull-out value for the above samples is 146.52 LBS/IN with a standard deviation of 29.92 LBS/IN.

The mean adjusted pull-out value of 146.52 for the coating 12 is approximately 15% better than the mean adjusted pull-out value for the same staple coated with a prior art nitrocellulose based coating. Additionally, as described above, the nitrocellulose coating relies more on a mechanical holding or gripping in the wood which loses some of its holding power over time, that is up to 30%, due to drying and relaxing of the wood. In contrast, the coating 12 of the invention loses only about 2–3% holding power over time due primarily to its physical and chemical adhesive bonding properties.

Modifications and variations of the present invention are possible in light of the above teachings. It therefore is to be understood that within the scope of the appended claims the invention may be practiced other than as specifically described.

What is claimed and desired to be secured by letters patent is:

1. A coated fastener, comprising:
   a fastener having a predetermined configuration comprising a pair of oppositely disposed sides, a pair of oppositely disposed ends adapted to be adhered to similarly configured adjacent fasteners, corner portions defined between adjacent ones of said sides and ends, and at least one portion capable of being driven into a desired surface; and
   coating means, disposed upon said fastener, comprising one-hundred percent dry solids which are substantially free of solvent emissions when applied to said fastener and during curing thereof, and covering substantially the entire exterior of said fastener, for providing a protective coating to said fastener by having a first predetermined thickness of said coating means upon at least said pair of sides and said pair of ends; and for adhering said fastener to at least one other similarly configured fastener and for providing an irregular surface to said fastener for increasing the holding power of said fastener after it is driven into said desired surface by having a second predetermined thickness of said coating means, which is greater than said first predetermined thickness of said coating means, at said corner portions of said fastener.

2. The fastener as defined in claim 1 wherein said coating means is a powder coating selected from one of a thermosetting and a thermoplastic based material.

3. The fastener as defined in claim 1 wherein said coating means is a polyester resin based coating.

4. The fastener as defined in claim 3 wherein said polyester coating is a powder including, by weight, from about 80–90 percent polyester resin, 4–5 percent accelerator, 1–2 percent flow control agent, 3–4 percent dispersing agent, and 1 percent surface active agent.

5. The fastener as defined in claim 4 wherein said accelerator is hydroxyalkyl amide, said flow control agent is an acrylic, said dispersing agent is stearic acid, and said surface active agent is benzoin.

6. The fastener as defined in claim 1 wherein said coating means is an epoxy resin based coating.

7. The fastener as defined in claim 6 wherein said epoxy coating is a powder including, by weight, from about 50–70 percent epoxy resin, 10–30 percent aromatic amine, 1–5 percent pigment, 10–30 percent calcium carbonate, 10–30 percent calcium sulfate, and 5–10 percent bisphenol A.

8. The fastener as defined in claim 1 wherein said coating means is at least one of polyethylene and nylon.

9. The fastener as defined in claim 1 wherein said coating means provides a roughened surface about the exterior of said fastener.

10. The fastener as defined in claim 1 wherein said holding power of said fastener remains substantially constant over time.

11. The fastener as defined in claim 1 wherein said coating means adhesively or chemically bind to the surface into which said coated fastener is driven.

12. A strip of coated fasteners, comprising:
a plurality of fasteners positioned in a side-by-side array, wherein each fastener has a predetermined configuration comprising a pair of oppositely disposed sides, a pair of oppositely disposed ends adapted to be adhered to adjacent ends of said plurality of fasteners disposed within said array, corner portions defined between adjacent ones of said sides and ends, and at least one portion capable of being driven into a desired surface; and
coating means, disposed upon each one of said fasteners, comprising one-hundred percent dry solids which are substantially free of solvent emissions when applied to said fasteners and during curing thereof, and covering substantially the entire exterior of each one of said fasteners, for providing a protective coating to each one of said fasteners by having a first predetermined thickness of said coating means disposed upon at least said pair of sides and said pair of ends; and for adhering said fasteners together in said side-by-side array so as to form said strip of coated fasteners and for providing irregular surface portions to said fasteners for increasing the holding power of each one of said fasteners after they are driven into said desired surface by having a second predetermined thickness of said coating means, which is greater than said first predetermined thickness of said coating means, at said corner portions of said fasteners.

13. The fastener strip as defined in claim 12 wherein said coating means is a powder coating selected from one of a thermosetting and a thermoplastic based material.

14. The fastener strip as defined in claim 12 wherein said coating means is a polyester resin based coating.

15. The fastener strip as defined in claim 14 wherein said polyester coating is a powder including, by weight, from about 80–90 percent polyester resin, 4–5 percent accelerator, 1–2 percent flow control agent, 3–4 percent dispersing agent, and 1 percent surface active agent.

16. The fastener strip as defined in claim 15 wherein said accelerator is hydroxyalkyl amide, said flow control agent is an acrylic, said dispersing agent is stearic acid, and said surface active agent is benzoin.

17. The fastener strip as defined in claim 12 wherein said coating means is an epoxy resin based coating.

18. The fastener strip as defined in claim 17 wherein said epoxy coating is a powder including, by weight, from about 50–70 percent epoxy resin, 10–30 percent aromatic amine, 1–5 percent pigment, 10–30 percent calcium carbonate, 10–30 percent calcium sulfate, and 5–10 percent bisphenol A.

19. The fastener strip as defined in claim 12 wherein said coating means is at least one of polyethylene and nylon.

20. The fastener strip as defined in claim 12 wherein said coating means provides a roughened surface about the exterior of each of said fasteners upon separation from said strip.

21. The fastener strip as defined in claim 12 wherein said holding power of said fasteners remains substantially constant over time.

22. The fastener strip as defined in claim 12 wherein said coating means adhesively or chemically bind to the surface into which one of said coated fasteners is driven.

* * * * *